UNITED STATES PATENT OFFICE.

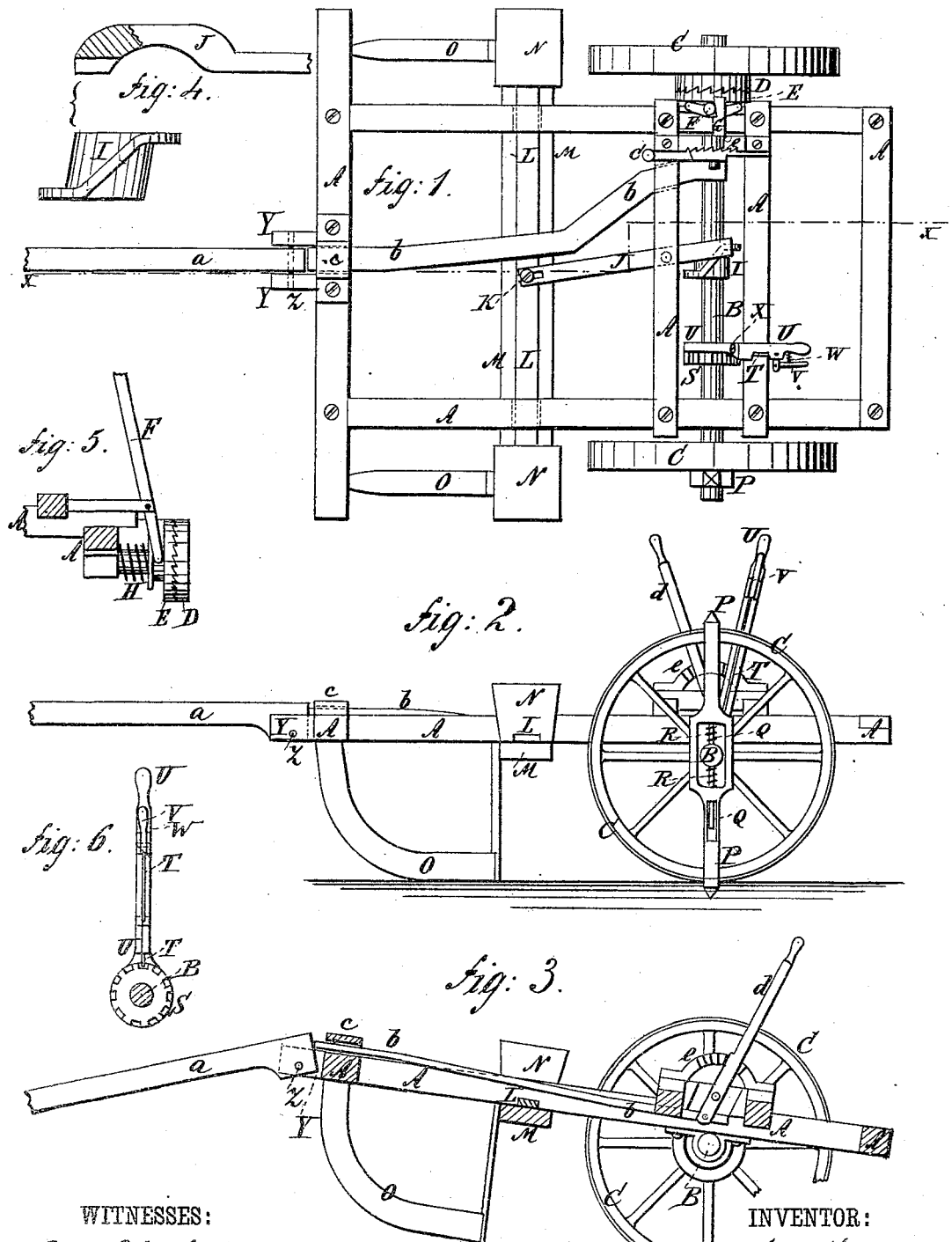

CHARLES P. HANSON, OF EDWARDSBURG, MICHIGAN.

SEED-PLANTER.

SPECIFICATION forming part of Letters Patent No. 248,457, dated October 18, 1881.

Application filed February 8, 1881. (No model.)

*To all whom it may concern:*

Be it known that I, CHARLES P. HANSON, of Edwardsburg, in the county of Cass and State of Michigan, have invented a new and useful Improvement in Seed-Planters, of which the following is a full, clear, and exact description, reference being had to the drawings hereto annexed, in which—

Figure 1 is a plan view of a planter, showing my improvement; Fig. 2, a side elevation of the same; Fig. 3, a sectional side elevation of the same, taken through the line $x$ $x$ of Fig. 1; and Figs. 4, 5, and 6, details of certain parts of the planter.

The object of my invention is to provide an improved means of raising the openers of a planter from the ground and adjusting them to work at any desired depth.

My invention consists in certain peculiarities of construction and arrangement, as hereinafter described.

Devices for raising the openers of a planter from the ground which operate by lifting or depressing the rear end of the tongue have generally been constructed with a number of pivoted arms connected with the tongue, and arranged above the planter. The tongue in these cases is made to project rearward beyond the forward portion of the frame, and it therefore requires more complicated mechanism and longer time for its operation than when the operating device is applied nearer to the pivotal point of the tongue. As the tongue is to be elevated at its pivotal point in order to elevate the openers, thereby forming an angle with the frame of the planter, it is evident that the smaller the arc in which the said rear end of the tongue is made to oscillate the more quickly and easily the desired result may be accomplished. Accordingly I provide the following arrangement of parts:

To the center of the forward side of the forward cross-bar of the frame A are attached two short parallel arms, Y, to and between which is pivoted, by a bolt, Z, the lower part of the rear end of the tongue $a$. The rear end of the tongue $a$ is made deep, so that the upper part of the said rear end will project above the arms Y and the cross-bar of the frame A, for the forward end of the sliding bar $b$ to strike against, as shown in Figs. 1, 2, and 3. The forward end of the sliding bar $b$ slides in a keeper, $c$, attached to the upper side of the forward cross-bar of the frame A, and the rear end of the said sliding bar $b$ is pivoted to the side of the lower end of the lever $d$. This lever $d$, at a little distance from its lower end, is pivoted to a support attached to the frame. The upper part of the lever $d$ moves along the side of the arched bar $e$, the ends of which are attached to the bar that supports the said lever $d$. Upon the side of the arched bar $e$ are formed teeth, with which engages the edge of the lever $d$, or a pawl formed upon or connected with the said lever $d$. With this construction, when the sliding bar $b$ is forced forward by operating the lever $d$ the forward end of the said slide is pressed against the upper part of the rear end of the tongue $a$, which movement causes the forward part of the frame A to rise, raising the openers O from the ground, so that the machine can be readily turned. With this construction, also, the openers O can be adjusted to work at any desired depth in the ground by operating the lever $d$, which may be held in any position into which it may be adjusted by the catch-bar $e$.

It will be seen that the slightest movement of the operating-lever is sufficient to adjust the tongue at a considerable angle with the frame, thereby lifting the openers above the ground, while by withdrawing the slide from contact with the tongue the weight of the frame will cause the openers to sink to the ground and throw the tongue into a horizontal position, as shown in Fig. 2. The advantages of this construction are that the desired operation of adjusting or elevating the openers can be performed by a very slight movement of the lever, while the device is so arranged as to occupy very little space, and, owing to its simplicity of construction, it is not liable to get out of order.

Having thus described my invention, what I claim as new, and desire to secure by Letters Patent, is—

1. In a seed-planter, the combination of frame A, tongue $a$, pivoted at its end so as to project above the frame, slide-bar *b*, adapted to be thrown in contact with the rear end of said tongue, and adjusting-lever *d*, substantially as shown and described, whereby the tongue and frame may be easily adjusted and held at any desired angle of inclination with each other, as and for the purpose specified.

2. In a seed-planter, the combination of frame A, having arms Y Y, tongue *a*, keeper *c*, and rack-bar *e*, with slide-bar *b* and lever *d*, substantially as shown and described, and for the purpose set forth.

CHAS. PERRY HANSON.

Witnesses:
MOSES H. LEE,
W. M. WALTER.